United States Patent
Oshima et al.

(10) Patent No.: US 11,035,876 B2
(45) Date of Patent: Jun. 15, 2021

(54) SENSOR WITH SERVO NOISE REDUCTION

(71) Applicant: HITACHI, LTD., Tokyo (JP)

(72) Inventors: Takashi Oshima, Tokyo (JP); Yuki Furubayashi, Tokyo (JP); Keijiro Mori, Tokyo (JP); Naoki Mori, Tokyo (JP); Akira Matsumoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 199 days.

(21) Appl. No.: 16/458,903

(22) Filed: Jul. 1, 2019

(65) Prior Publication Data

US 2020/0088759 A1    Mar. 19, 2020

(30) Foreign Application Priority Data

Sep. 14, 2018    (JP) .............................. JP2018-172202

(51) Int. Cl.
    *G01P 15/125*    (2006.01)
    *G01P 15/13*    (2006.01)
    *G01P 15/08*    (2006.01)

(52) U.S. Cl.
    CPC ............ *G01P 15/125* (2013.01); *G01P 15/13* (2013.01); *G01P 15/131* (2013.01); *G01P 2015/0865* (2013.01)

(58) Field of Classification Search
    CPC .. G01P 15/125; G01P 15/131; G01P 15/0802; G01P 15/13; G01P 2015/0831; G01P 2015/0837
    See application file for complete search history.

(56) References Cited

U.S. PATENT DOCUMENTS

| 2016/0091524 A1* | 3/2016 | Kamada ............... B81B 3/0086 73/514.32 |
| 2016/0091525 A1 | 3/2016 | Oshima et al. |
| | | (Continued) |

FOREIGN PATENT DOCUMENTS

| JP | 2016-070815 A | 5/2016 |
| WO | 2016132447 A1 | 8/2016 |

OTHER PUBLICATIONS

M. Pastre et al "A 300Hz 19b DR capacitive accelerometer based on a versatile front end in a 5th-order ΔΣ loop," 2009IEEE European Solid-state Circuits Conference, pp. 288-291, Sep. 2009.
(Continued)

*Primary Examiner* — Helen C Kwok
(74) *Attorney, Agent, or Firm* — Volpe Koenig

(57) ABSTRACT

Provided is a sensor that is highly accurate while ensuring reduced power consumption. A sensor is an electronic circuit that includes a sensor element, an analog filter, an A/D converter, and first and second electronic circuit. The analog filter filters a waveform that includes a sensor signal from the sensor element and noise based on a servo signal. The A/D converter converts the waveform filtered by the analog filter into a first digital signal. The first electronic circuit includes a digital filter and acquires a second digital signal by performing signal processing including at least a filtering process on the servo signal by using the digital filter. The second electronic circuit acquires a third digital signal by subtracting the second digital signal from the first digital signal. A setting for the signal processing for acquiring the second digital signal is changed on the basis of the third digital signal.

14 Claims, 8 Drawing Sheets

(56) References Cited

U.S. PATENT DOCUMENTS

2018/0011125 A1*  1/2018  Oshima ............... G01P 15/125
2019/0195909 A1*  6/2019  Koenigsberg ......... G01P 15/125
2019/0212358 A1*  7/2019  Oshima ............... G01P 15/125
2020/0072865 A1*  3/2020  Oshima ............... G01P 15/125

OTHER PUBLICATIONS

T. Oshima et al., "Novel automatic tuning method of RC filters using a digital-DLL technique" IEEE Journal of Solid-State Circuits (JSSC), pp. 2052-2054 (2004).

* cited by examiner

SENSOR WITH SERVO NOISE REDUCTION

BACKGROUND OF THE INVENTION

1. Field of the Invention

The present invention relates to a sensor, and more particularly, to a MEMS (Micro Electro Mechanical System) capacitive acceleration sensor.

2. Description of the Related Art

Acceleration sensors are used, for example, to explore oil, natural gas, and other natural resources. In seismic reflection survey for exploring oil, natural gas and other resources, for example, a number of acceleration sensors are installed in a given two-dimensional arrangement on the earth's surface above a stratum that is likely to hold resources. An artificial earthquake is produced, and reflected waves resulting from the reflection of seismic waves of the earthquake by the stratum are detected by the acceleration sensors as accelerations. The condition of the stratum is grasped by analyzing acceleration data using all of the group of two-dimensionally arranged acceleration sensors at once, thus judging whether oil, natural gas, and other resources are present.

Acceleration sensors for seismic reflection survey detect extremely weak acceleration signals. Therefore, such sensors are required to keep their noise an order of magnitude lower than acceleration sensors used in other fields. Also, it is necessary to reduce costs of batteries for supplying power to the acceleration sensors in order to reduce the cost of an apparatus that includes the acceleration sensors. Therefore, the reduction in power consumption of the acceleration sensors is required at the same time.

In the past seismic reflection survey, geophones were used as ultralow noise acceleration sensors. However, geophones are probably unfit for next-generation high-accuracy seismic survey due, for example, to increase in noise produced in low frequency bands at several tens of Hz, a theoretically narrow input frequency bandwidth, and unfitness for mass production. For this reason, highly sensitive and low-power-consuming MEMS acceleration sensors theoretically capable of avoiding the above problem are beginning to hold promise for use in next-generation high-accuracy seismic survey.

MEMS acceleration sensors are disclosed, for example, in M. Pastre, M. Kayal, H. Schmid, A. Huber, P. Zwahlen, A. Nguyen and Y. Fong, "A 300 Hz 19b DR capacitive accelerometer based on a versatile front end in a $5^{th}$-order $\Delta\Sigma$ loop," 2009IEEE European Solid-state Circuits Conference, pp. 288-291, September 2009, that is herein after referred to as Non-patent document 1, JP-2016-070815-A, and WO2016/132447.

SUMMARY OF THE INVENTION

Non-patent document 1 discloses a MEMS capacitive acceleration sensor as a MEMS acceleration sensor. In non-patent document 1, servo control is used to realize stably low noise. In non-patent document 1, a MEMS capacitive element is shared to apply an electrostatic force for acceleration signal detection and servo control so that the acceleration signal detection and the servo control are performed alternately in a time-divided manner. Because of a time division process, a time period during which each of the acceleration signal detection and the servo control is active is shorter. For this reason, it is necessary to run internal circuitry faster or generate a higher voltage for applying an electrostatic force, thus resulting in increased power consumption.

In JP-2016-070815-A, a MEMS capacitive element for acceleration signal detection and a MEMS capacitive element for applying an electrostatic force for servo control are provided. This allows for acceleration signal detection and servo control to be performed simultaneously in parallel, making high-speed operation of the internal circuitry and high voltage generation unnecessary and contributing to reduced power consumption. However, performing acceleration signal detection and servo control at the same time entails a problem in that a servo signal leaks and is superimposed on a detection signal, thus resulting in increased noise. In order to realize an ultralow noise acceleration sensor required for next-generation high-accuracy seismic survey, it is necessary to cancel a leakage component of a servo signal with extremely high accuracy.

T. Oshima, K. Maio, Hioe et al., "Novel automatic tuning method of RC filters using a digital-DLL technique" IEEE Journal of Solid-State Circuits (JSSC), pp. 2052-2054 (2004), that is herein after referred to as Non-patent document 2 discloses a technology for canceling a leakage component of a servo signal (servo leakage signal) by using a variable capacitance circuit connected to an input of a charge amplifier. This technology is effective. In order to sufficiently improve the accuracy with which to cancel the servo leakage signal, however, it is necessary to change the capacitance of the variable capacitance circuit with sufficiently small uniform increments or decrements. However, it is not easy to realize such a variable capacitance circuit due to constraints of semiconductor manufacturing processes, i.e., minimum manufacturable capacitance, manufacturing variations of the capacitance, and parasitic capacitance effect.

It should be noted that although non-patent document 2 does not disclose any MEMS capacitive acceleration sensor but discloses a technology regarding an analog filter and a tuning circuit.

Of the embodiments described in the present application, a typical embodiment can be briefly described as follows:

That is, a sensor is an electronic circuit that includes a sensor element, an analog filter, an A/D converter, and first and second electronic circuits. The analog filter filters a waveform that includes a sensor signal from the sensor element and noise based on a servo signal. The A/D converter converts a waveform filtered by the analog filter into a first digital signal. The first electronic circuit includes a digital filter and acquires a second digital signal by performing signal processing including at least a filtering process on the servo signal by using the digital filter. The second electronic circuit acquires a third digital signal by subtracting the second digital signal from the first digital signal. A setting for the signal processing for acquiring the second digital signal is changed at least on the basis of the third digital signal.

A waveform corresponding to the noise waveform included in the waveform filtered by the analog filter is generated by filtering the servo signal with the digital filter. The second digital signal that provides a reduced noise component included in the third digital signal is acquired through adaptive control and then subtracted from the first digital signal, by changing the setting for signal processing including the filtering process on the basis of the third digital signal acquired by subtracting the second digital signal from the first digital signal. This allows for the noise component included in the first digital signal to be cancelled with high accuracy, thus ensuring improved accuracy. Also, signal detection and servo control using the sensor element are performed in parallel, thus contributing to reduced power consumption.

Of the inventions disclosed in the present application, the effect obtained by the typical inventions can be summarized as follows:

That is, the effect of the invention is to provide a highly accurate sensor while ensuring reduced power consumption.

The above problem, configuration, and effect will become apparent from the following description of embodiments of the invention.

DESCRIPTION OF THE PREFERRED EMBODIMENTS

Figure 1:
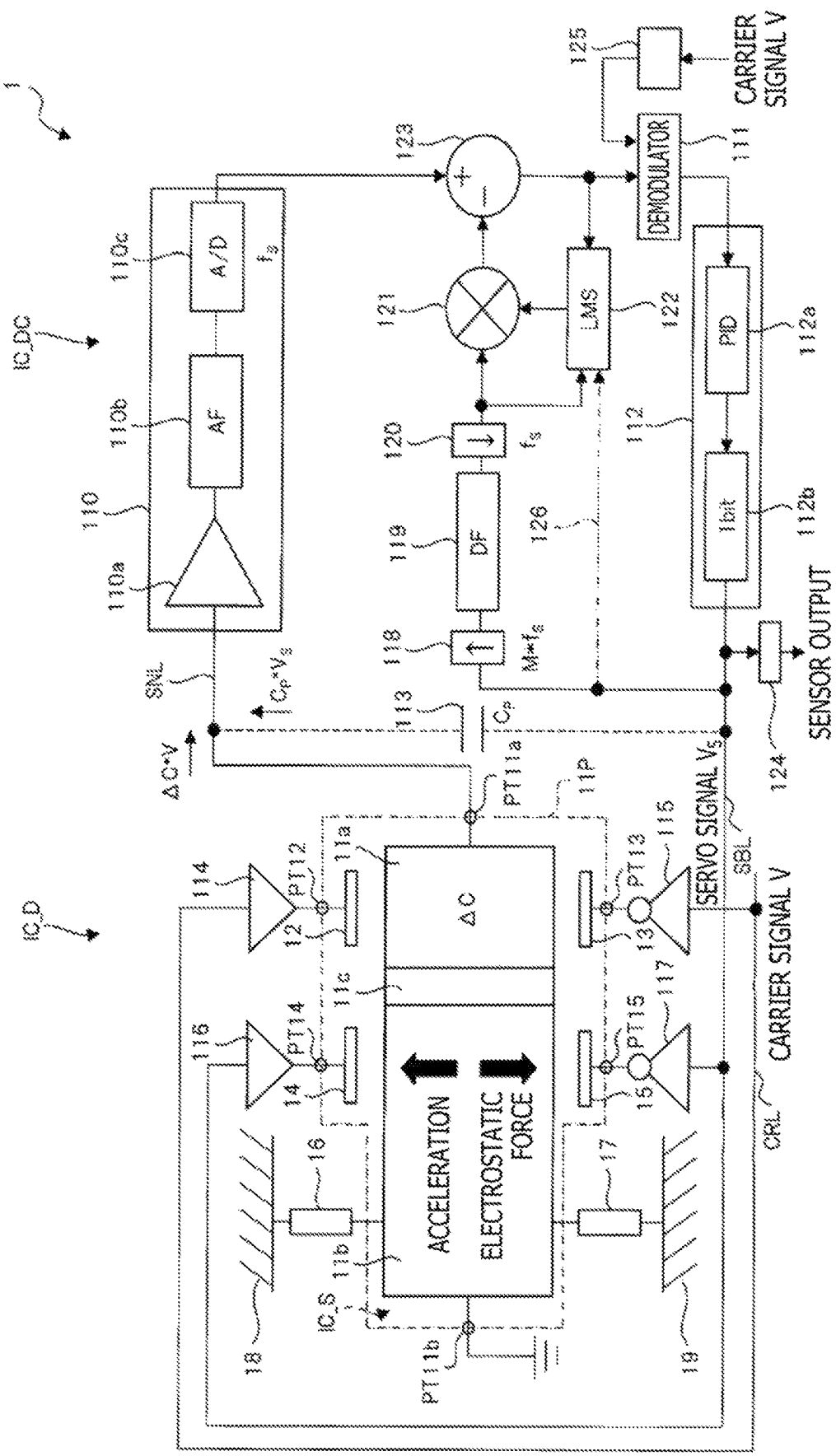
FIG. 1 is a block diagram illustrating a configuration of a sensor according to embodiment 1.

Although the following embodiments will be described separately and the descriptions will be divided into sections as necessary for convenience, unless otherwise specified, the descriptions are not irrelevant to each other and, instead, provide examples of modifications, details, or supplemental remarks pertaining to partial or full description given in other sections. In the following descriptions of the embodiments, if the number of elements (including counts, values, amount, ranges, and so on) is mentioned, unless otherwise specified or obviously limited to a certain number in principle, the number is not limited to the mentioned number and may be larger or smaller than that number.

Further, it needless to say that the components mentioned in the following descriptions of the embodiments (including component steps) are not always necessary, unless specified explicitly and obviously considered indispensable. Similarly, the shapes and positional relationships of the components and other elements mentioned in the descriptions of the embodiments are assumed to substantially include shapes and other features analogous or similar thereto, unless otherwise specified or obviously such other shapes and positional relationships would be incorrect in principle. This rule also applies to the values and ranges mentioned above.

The embodiments of the present invention will now be described with reference to the attached drawings. In all the attached drawings for illustrating the embodiments of the present invention, the same reference numerals indicate the same members, and repeated descriptions will be omitted. In the following descriptions of the embodiments, acceleration sensors will be described as examples of sensors. However, the present invention is applicable to a variety of other types of sensors.

Embodiment 1

FIG. 1 is a block diagram illustrating a configuration of an acceleration sensor according to embodiment 1. In FIG. 1, reference numeral 1 denotes an acceleration sensor. In the descriptions given below, an acceleration sensor will be simply referred to as a sensor unless otherwise required to demonstrate that the sensor is an acceleration sensor. The sensor 1 according to embodiment 1 includes, although not limited thereto, three semiconductor devices. For reasons of explanation, the three semiconductor devices included in the sensor 1 will be denoted as a sensor semiconductor device IC_S, a driving semiconductor device IC_D, and a detection/control semiconductor device IC_DC. The sensor semiconductor device IC_S is realized by integrating acceleration sensor elements (hereinafter referred to as sensor elements). The driving semiconductor device IC_D drives the sensor elements on the basis of a servo signal Vs and a carrier signal V. The detection/control semiconductor device IC_DC produces a sensing output based on sensing signals from the sensor elements and outputs the servo signal Vs for controlling the sensor elements.

In FIG. 1, a long dashed short dashed line 11P indicates a package of the sensor semiconductor device IC_S. The sensor elements are incorporated in the package 11P. To avoid complexity in FIG. 1, Packages of the driving semiconductor device IC_D and the detection/control semiconductor device IC_DC are not depicted in FIG. 1.

<Sensor Element>

A sensor element includes a MEMS capacitive element. The HEMS capacitive element includes a first detection movable electrode 11a, first detection fixed electrodes 12 and 13, a servo control movable electrode 11b, servo control fixed electrodes 14 and 15, and an insulating portion 11c. Each of the first detection fixed electrodes 12 and 13 is arranged to be opposed to the first detection movable electrode 11a, and detection capacitances are formed between the first detection fixed electrodes 12 and 13 and the first detection movable electrode 11a. That is, the detection capacitance pair is formed by the first detection movable electrode 11a and the pair of first detection fixed electrodes 12 and 13.

Each of the servo control fixed electrodes 14 and 15 is formed to be opposed to the servo control movable electrode 11b, and servo control capacitances are formed between the servo control fixed electrodes 14 and 15 and the servo control movable electrode 11b. That is, the servo control capacitance pair is formed by the servo control movable electrode 11b and the pair of servo control fixed electrodes 14 and 15.

To ensure electrical insulation between the detection capacitance pair and the servo control capacitance pair, the insulating portion 11c lies between the first detection movable electrode 11a and the servo control movable electrode 11b. That is, the first detection movable electrode 11a and the servo control movable electrode 11b are connected together by the insulating portion 11c, and the position of the first detection movable electrode 11a changes with change of the position (displacement) of the servo control movable electrode 11b. For example, in the case where the position of the servo control movable electrode 11b is displaced toward the servo control fixed electrode 14 (hereinafter also referred to as upward) in the plane of FIG. 1, the position of the first detection movable electrode 11a will be also displaced upward in coordination with the displacement of the servo control movable electrode 11b. In the case where the position of the servo control movable electrode 11b is displaced toward the servo control fixed electrode 15 (hereinafter also referred to as downward), the position of the first detection movable electrode 11a will be also displaced downward in coordination with the displacement of the servo control movable electrode 11b. That is, the first detection movable electrode 11a is displaced upward or downward in coordination with the upward or downward displacement of the servo control movable electrode 11b. The first detection movable electrode 11a, the servo control movable electrode 11b, and the insulating portion 11c mechanically play a role of a weight in the sensor element and move as an integral piece.

The above detection capacitance pair is a pair of two capacitances, one having a capacitance value of C+ΔC formed between the first detection movable electrode 11a and the first detection fixed electrode 12, and another having a capacitance value of C−ΔC formed between the first detection movable electrode 11a and the first detection fixed electrode 13. The capacitance value C here represents the capacitance value of each capacitance of the detection capacitance pair when the weight is located at a center between the first detection fixed electrodes 12 and 13. When the weight is located at the center between the first detection fixed electrodes 12 and 13, the above capacitance ΔC is zero. In contrast, when the weight is located above the center, the capacitance ΔC becomes positive, and when the weight is located below the center, the capacitance ΔC becomes negative. That is, the detection capacitance pair changes complementarily in accordance with the weight position. In other words, the detection capacitance pair changes complementarily in accordance with distances between the first detection fixed electrodes 12 and 13 and the weight.

An area of the servo control movable electrode 11b opposed to the servo control fixed electrode 14 is connected to a frame portion 18 of the sensor 1 by a spring 16, and an area of the servo control movable electrode 11b opposed to the servo control fixed electrode 15 is connected to the frame portion 18 of the sensor 1 by a spring 17. When the first detection movable electrode 11a making up the weight is located at the center between the first detection fixed electrodes 12 and 13, the springs 16 and 17 have their natural lengths. At this time, therefore, no elastic forces of the springs 16 and 17 act on the weight.

In contrast, when the weight is located above the center between the first detection fixed electrodes 12 and 13, the spring 16 contracts, exerting a downward elastic force on the weight. At this time, the sprig 17 expands, similarly exerting a downward elastic force on the weight. Therefore, a downward resultant force of these two forces acts on the weight. On the other hand, when the weight is located below the center, the spring 16 expands whereas the spring 17 contracts, exerting an upward elastic force on the weight. As a result, an upward resultant force of these two forces acts on the weight.

As described above, the servo control movable electrode 11b is connected to a frame (16 and 17) by the springs 16 and 17 whereas the servo control fixed electrodes 14 and 15 and the first detection fixed electrodes 12 and 13 are fastened to the frame (18 and 19) of the sensor 1.

In FIG. 1, PT11a, PT11b, and PT12 to PT15 depict terminals (pins) of the sensor semiconductor device IC_S provided on the package 11P. The first detection movable electrode 11a, the servo control movable electrode 11b, the first detection fixed electrodes 12 and 13, and the servo control fixed electrodes 14 and 15 are connected, for example, to corresponding pad electrodes on a corresponding semiconductor chip. The respective pad electrodes and their corresponding lead frames are connected, for example, by bonding wires. Some of the lead frames are exposed from the package 11P as the terminals PT11a, PT11g, and PT12 to PT15. For example, the first detection movable electrode 11a is connected to a corresponding pad electrode, and this pad electrode is connected to the lead frame corresponding to the terminal PT11a by a bonding wire. Similarly, the servo control movable electrode 11b, the first detection fixed electrodes 12 and 13, and the servo control fixed electrodes 14 and 15 are connected respectively to the corresponding terminals PT11b, and PT12 to PT15.

<Detection/Control Semiconductor Device>

The detection/control semiconductor device IC_DC includes a detection circuit 110, a subtractor 123, a demodulator 111, a control circuit 112, a low-pass filter 124, and a delay circuit 125. Further, the detection/control semiconductor device IC_DC includes an up-sampler 118, a digital filter 119, a down-sampler 120, a multiplier 121, and a servo signal leakage amount search unit (hereinafter referred to as a search unit) 122 which will be described later.

First, a basic configuration excluding the up-sampler 118, the digital filter 119, the down-sampler 120, the multiplier 121, and the search unit 122 will be described.

The first detection movable electrode 11a is connected to a wire SNL (second wire) via the terminal PT11a, and the detection circuit 110 is connected to the wire SNL. The detection circuit 110 includes a capacitance/voltage (hereinafter referred to as C/V) conversion amplifier 110a, an analog filter 110b, and an analog/digital (hereinafter referred to as A/D) converter 110c. The C/V conversion amplifier 110a, the analog filter 110b, and the A/D converter 110c are connected in series, and the C/V conversion amplifier 110a at a first stage is connected to the wire SNL.

A charge change (ΔC*V) proportional to a capacitance change ΔC resulting from a change in the weight position is conveyed to the C/V conversion amplifier 110a via the wire SNL. The C/V conversion amplifier 110a generates a voltage signal corresponding to this charge change. It should be noted that the voltage V here is the voltage of the carrier signal V which will be described later.

The voltage signal generated by the C/V conversion amplifier 110a is supplied to the analog filter 110b where noise outside a signal band is suppressed, after which the signal is supplied to the A/D converter 110c at the subsequent stage. As described above, the filtering of the supplied voltage signal with the analog filter 110b ensures reduced aliasing that occurs during A/D conversion by the A/D converter 110c. The A/D converter 110c converts a filtered analog voltage supplied from the analog filter 110b into a digital signal and outputs the digital signal as an output signal of the detection circuit 110. It should be noted that an amplifier may be inserted between the C/V conversion amplifier 110a and the analog filter 110b. The analog filter 110b may be divided into a plurality of stages so that an amplifier is provided between each pair of adjacent analog filters and so that the analog filters and the amplifiers alternate.

The digital signal output from the detection circuit 110 is input to the subtractor 123. Although described later, the servo signal Vs leaks via an equivalent parasitic capacitance 113 and propagates to the wire SNL to which the C/V conversion amplifier 110a is connected. That is, noise corresponding to the charge change based on the servo signal Vs (Cp*Vs in FIG. 1) is superimposed on the signal corresponding to the charge change (ΔC*V), and the sum thereof is supplied to the C/V conversion amplifier 110a. Although described later, reference numeral Cp denotes an equivalent parasitic capacitance 113, and reference numeral Vs denotes a voltage of the servo signal Vs.

For this reason, the waveform including noise based on the servo signal Vs is filtered by the analog filter 110b, thus converting the waveform into a digital form. The subtractor 123 functions in such a manner as to subtract noise corresponding to a leakage component of the servo signal Vs from the digital signal from the detection circuit 110, thus canceling the leakage component of the servo signal Vs from the digital signal. The digital signal output from the subtractor 123 is supplied to the demodulator 111. The carrier signal Vs delayed by a given amount of time by the delay circuit 125 is supplied to the demodulator 111. The demodulator 111 multiplies the supplied digital signal by the delayed carrier signal V, thus acquiring a digital signal proportional to the capacitance change ΔC. The output of this demodulator 111 is supplied to the control circuit 112.

The control circuit 112 generates a one-bit (binary) servo signal on the basis of the supplied digital signal that is proportional to the capacitance change ΔC. To be specific, the control circuit 112 includes a PID (Proportional-Integral-Differential) control unit 112a and a one-bit converter 112b. The PID control unit 112a generates a multi-value control signal from a digital signal proportional to the capacitance change ΔC by using a PID control technique. Next, the multi-value control signal is converted into a one-bit servo signal Vs by the one-bit converter 112b. A one-bit quantizer or a one-bit output type digital delta-sigma converter is, for example, used as the one-bit converter 112b. In the case where a one-bit quantizer is used to make up the one-bit converter 112b, a non-negative input represented by a multi-value control signal is converted into the servo signal Vs of "1," and a negative input is converted into the digital signal Vs of "−1."

High frequency components are filtered out from the servo signal Vs output from the control signal 112 by the low-pass filter 124, after which the signal is output as an output of the sensor 1. The servo signal Vs output from the control signal 112 is supplied to a wire SBL (first wire). The wire SBL connects the driving semiconductor device IC_D and the detection/control semiconductor device IC_DC together.

<Driving Semiconductor Device>

The driving semiconductor device IC_D includes a servo control buffer 116, a servo control inversion buffer 117, a detection buffer 114, and a detection inversion buffer 115.

The inputs of the servo control buffer 116 and the servo control inversion buffer 117 are connected to the wire SBL. The output of the servo control buffer 116 is connected to the servo control fixed electrode 14 via the terminal PT14, and the output of the servo control inversion buffer 117 is connected to the servo control fixed electrode 15 via the terminal PT15.

A voltage suitable for servo control is supplied to the servo control buffer 116 and the servo control inversion buffer 117. The servo control buffer 116 and the servo control inversion buffer 117 operate on the supplied voltage as a source voltage. This allows the servo control buffer 116 to convert a one-bit servo signal supplied via the wire SBL into a one-bit voltage signal VP at a voltage level suitable as a servo signal (refer to FIG. 9 described later). The servo control inversion buffer 117 inverts the logic (phase) of the one-bit servo signal supplied via the wire SBL, converting the signal into a one-bit voltage signal VN at a voltage level suitable as a servo signal (refer to FIG. 9 described later). The voltage signal VP generated by the conversion is applied to the servo control fixed electrode 14, and the one-bit voltage signal VN is applied to the servo control fixed electrode 15. It should be noted that the servo control movable electrode 11b is connected to a fixed potential such as ground potential via the corresponding terminal PT11b.

The carrier signal V is supplied to the inputs of the detection buffer 114 and the detection inversion buffer 115 via a wire CRL. The carrier signal V is a pulse signal having a given constant frequency. A voltage suitable for detection is supplied to the detection buffer 114 and the detection inversion buffer 115. The detection buffer 114 and the detection inversion buffer 115 operate on the supplied voltage as a source voltage. This allows the detection buffer 114 to convert the carrier signal supplied via the wire CRL into a pulse voltage signal VDP at a voltage level suitable as a carrier signal (refer to FIG. 9 described later). The detection inversion buffer 115 inverts the logic (phase) of the carrier signal supplied via the wire CRL, converting the signal into a pulse voltage signal VDN at a voltage level suitable as a carrier signal (refer to FIG. 9 described later). The pulse voltage signal VDP generated by the conversion is applied to the detection fixed electrode 12, and the pulse voltage signal VDN is applied to the detection fixed electrode 13.

It should be noted that although not limited, the source voltage supplied to the servo control buffer 116, the servo control inversion buffer 117, the detection buffer 114, and the detection inversion buffer 115 is higher than the source voltage supplied to circuit blocks of the detection/control semiconductor device IC_DC. In embodiment 1, therefore, the driving semiconductor device IC_D includes a semiconductor device different from the detection/control semiconductor device IC_DC. However, the driving semiconductor device IC_D and the detection/control semiconductor device IC_DC may be made up of a single semiconductor device.

<Carrier Signal and Servo Signal>

Figure 9:
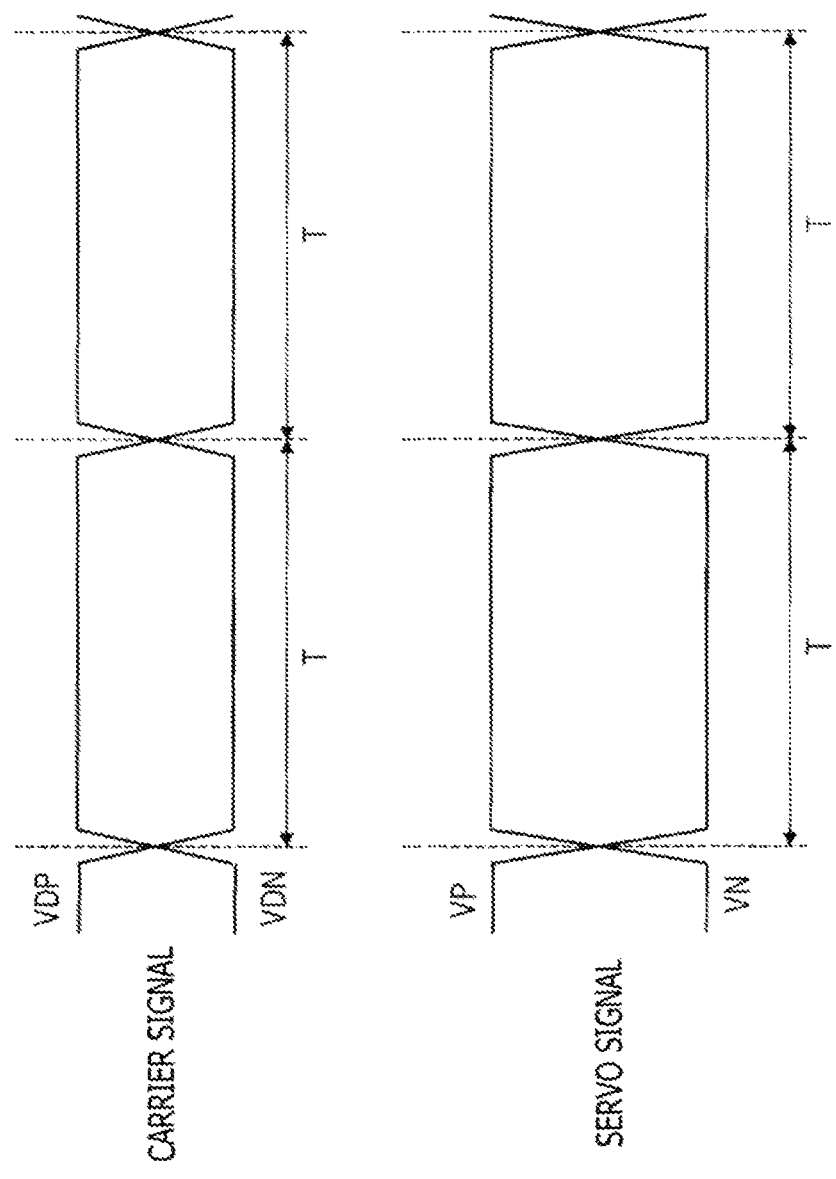
FIG. 9 is a timing diagram illustrating operation of the sensor according to embodiment 1.

FIG. 9 is a timing diagram illustrating operation of the sensor according to embodiment 1. In FIG. 9, pulse voltage signals output from the detection buffer 114 and the detection inversion buffer 115 are depicted as carrier signals. The carrier signal supplied to the wire CRL and the delay circuit 125 is in phase with the pulse voltage signal output from the detection buffer 114. One-bit voltage signals output from the servo control buffer 116 and the servo control inversion buffer 117 are also depicted as servo signals. The servo signal Vs output from the control circuit 112 is in phase with the one-bit voltage signal output from the servo control buffer 116.

We assume here that the carrier signal V is a pulse signal having a 50% duty ratio and a 1/(2T) frequency. The carrier signal V has a constant frequency, and its voltage level varies with a period T. On the other hand, the servo signal Vs is output from the control circuit 112 at a 1/T rate. The control circuit 112 outputs, for example, the servo signal Vs of "1" or "−1" that is continuous in time. Therefore, the servo signal Vs is output at intervals of the period T. Defining fs to be 1/T here, the frequency of the carrier signal V is fs/2, and the output rate of the servo signal Vs is fs. In embodiment 1, the A/D converter 110c, the subtractor 123, the demodulator 111, the PID control unit 112a, and the one-bit converter 112b operate at the rate of fs. In other words, the outputs of these circuit blocks are determined at intervals of the period T.

<Sensor Operation>

In the sensor element, the first detection fixed electrodes 12 and 13 and the servo control fixed electrodes 14 and 15 are fastened to the frames 18 and 19 as described above. The frames 18 and 19 of the sensor 1 are fastened to a surface of a target object whose acceleration is to be measured, in such a manner as to move integrally with the target object. If an acceleration signal 'a' is applied to the target object and the frames 18 and 19 due, for example, to vibration, an inertial force '−m*a' whose magnitude is equal to a product of a mass of the weight and the magnitude of the acceleration signal 'a' is applied to the weight in the direction opposite to the acceleration signal 'a.' Further, a gravitational force 'm*g*cos θ' is also applied to the weight, where m is the mass of the weight, i.e., the sum of the masses of the first detection movable electrode 11a, the servo control movable electrode 11b, and the insulating portion 11c, g is 9.8 m/s², a gravitational acceleration, and θ is the angle formed between the direction of vibration of the weight and the vertical direction. In the present specification, the sum of the inertial force and the gravitational force applied to the weight, i.e., 'm*(−a+g*cos θ),' will be hereinafter referred to as an external force.

When an acceleration signal 'a' is applied to the sensor 1, the external force is applied to the weight, causing the weight position to be displaced and producing the capacitance change ΔC in the above detection capacitance pair. The displacement of the weight occurs such that the elastic forces of the springs 16 and 17 and the external force are in balance.

The detection circuit 110 and the demodulator 111 detect the capacitance change ΔC as described above on the basis of a sensor signal from the sensor element and output a signal proportional to the capacitance change ΔC to the control circuit 112. The control circuit 112 generates, on the basis of the signal proportional to the capacitance change ΔC, the servo signal Vs that brings the capacitance change ΔC close to zero, and a one-bit signal voltage based on the servo signal Vs is applied to the servo control fixed electrodes 14 and 15. As a result of the application of the one-bit signal voltage based on the servo signal Vs to the servo control fixed electrodes 14 and 15, an electrostatic force proportional to the servo signal Vs is produced between the servo control fixed electrodes 14 and 15 and the servo control movable electrode 11b and acts on the weight. As a result, not only the external force but also the electrostatic force attempting to cancel the external force are applied to the weight.

In the case where the produced electrostatic force proportional to the servo signal Vs is still not equal to the external force, the displacement of the weight and the capacitance change ΔC occur such that the difference between the electrostatic force and the external force and the elastic forces of the springs 16 and 17 are in balance. Hereinafter, the detection of the capacitance change ΔC and the generation and application of the servo signal Vs are similarly repeated, after which a steady state is reached where the external force and the electrostatic force applied to the weight are in balance. In a steady state, no elastic forces are required. There is no displacement of the weight, that is, the weight is maintained at the center between the first detection fixed electrodes 12 and 13.

In a steady state, the electrostatic force is in balance with the external force corresponding to the acceleration signal 'a.' Therefore, the servo signal Vs that is producing the electrostatic force corresponds to the input acceleration signal 'a.' For this reason, the servo signal Vs can be considered as an output signal of the sensor 1. The servo signal Vs includes, in a high frequency range, much noise attributable to quantization error caused by the one-bit converter 112b. Therefore, high frequency components are suppressed by the low-pass filter 124 as described above before the servo signal Vs is output as a sensor output. It should be noted that this low-pass filter 124 includes a digital filter.

As a result of the application of a pulse signal based on the carrier signal V to the first detection fixed electrodes 12 and 13 as described above, a charge signal having charge (ΔC*V) equivalent to the product of the capacitance change ΔC and the carrier signal V is generated in the first detection movable electrode 11a. This charge signal is supplied to the C/V conversion amplifier 110a provided at the first stage of the detection circuit 110 as a sensor signal and converted into a voltage signal. The frequency of the carrier signal V is fs/2 as described above. The capacitance change ΔC produced by the displacement of the weight is slower than the voltage change of the carrier signal V. Therefore, the slow capacitance chancre ΔC, in other words, a low-frequency capacitance change ΔC signal, is converted into a frequency close to the frequency fs/2 of the carrier signal V and supplied to the C/V conversion amplifier 110a as a charge signal. In other words, the charge signal is formed by the superimposition of the low-frequency capacitance chancre ΔC signal on the carrier signal V, a carrier.

For this reason, even if low-frequency 1/f noise or a DC offset voltage is added to the charge signal in the detection circuit 110a, such noise or such a voltage does not produce any noise on the capacitance change ΔC signal. That is, even if low-frequency 1/f noise or a DC offset voltage occurs in the detection circuit 110a, such noise or such a voltage does not produce any noise in the sensor.

The charge signal is multiplied by the carrier signal V from the delay circuit 125 again in the demodulator 111, thus being converted again into a low-frequency signal proportional to the capacitance change ΔC signal. That is, the output of the demodulator 111 is proportional to ΔC*V². However, the carrier signal, V, is a pulse signal and becomes constant when squared. For this reason, the output of the demodulator 111 is proportional only to the capacitance change ΔC. The charge signal is delayed by the detection circuit 110. Therefore, the carrier signal V is delayed by the delay circuit 125 by as much as the delay time caused by the detection circuit 110, thus ensuring synchronization between the carrier signal V and the charge signal during the multiplication in the demodulator 111. It should be noted that a filter may be provided after the multiplication by the above multiplier to suppress undesired components with the filter.

<Up-Sampler, Digital Filter, Down-Sampler, Multiplier, and Search Unit>

In the event of a mismatch between two capacitance values of the servo control capacitance pair, i.e., the capacitance value formed between the servo control movable electrode 11b and the servo control fixed electrode 14 and the capacitance value formed between the servo control movable electrode 11b and the servo control fixed electrode 15, charge proportional to the servo signal Vs is generated on the servo control movable electrode 11b. However, the insulating portion 11c lies between the servo control movable electrode 11b and the first detection movable electrode 11a. Therefore, the charge on the servo control movable electrode 11b generated by the mismatch is blocked by the insulating portion 11c. As a result, even if charge proportional to the servo signal Vs is generated, that charge is not transferred to the first detection movable electrode 11a.

Actually, however, in the sensor semiconductor device IC_S and the driving semiconductor device IC_D, for example, parasitic capacitances are present between the wires for transferring the servo signals and their inverted signals. Parasitic capacitances are also present between the terminals provided in the package 11P of the sensor semiconductor device IC_S and/or in the wires connecting the semiconductor devices.

For example, in the driving semiconductor device IC_D, parasitic capacitances are likely present between the output wires of the detection buffer 114, the detection inversion buffer 115, the servo control buffer 116, and the servo control inversion buffer 117. In the sensor semiconductor device IC_S, parasitic capacitances are likely present between the terminals PT11a and PT12 to PT15 in the package 11P. Further, in the sensor semiconductor device IC_S, parasitic capacitances are likely present between the bonding wires for connecting the electrodes and the corresponding terminals and between the lead frames. Considering the wires connecting the semiconductor devices, parasitic capacitances are likely present, for example, between the wires SNL and SBL.

These parasitic capacitances can be equivalently combined into an equivalent parasitic capacitance 113 connected between the wires SNL and SBL. The capacitance value of the equivalent parasitic capacitance 113 will be denoted as $C_p$ for description. In the case where the parasitic capacitance associated with the reverse phase servo signal Vs (e.g., VN in FIG. 9) is larger than the parasitic capacitance associated with the positive phase servo signal (e.g., VP in FIG. 9), the equivalent parasitic capacitance $C_p$ is negative.

Because of the presence of the equivalent parasitic capacitance 113 that is equivalently depicted, the change in the servo signal Vs is transferred to the wire SNL as noise via the equivalent Parasitic capacitance 113 in response to the change in the servo signal Vs. That is, a leakage charge component $C_p*Vs$ of the servo signal proportional to the product of the servo signal Vs and the equivalent parasitic capacitance $C_p$ is supplied to the wire SNL where the leakage charge component $C_p*Vs$ is superimposed on the charge signal $\Delta C*V$. This leakage charge component $C_p*Vs$ includes, in the frequency range close to the frequency fs/2, much noise attributable to quantization error caused by the one-bit converter 112b. That is, the noise component attributable to quantization error is converted into the frequency fs/2 of the carrier signal Vs. For this reason, the leakage charge component $C_p*Vs$ affects the charge signal $\Delta C*V$ whose frequency has been converted into a frequency range close to the same frequency of fs/2, thus resulting in increased noise in the sensor 1.

In embodiment 1, the leakage charge component $C_p*Vs$ of the servo signal is cancelled in the digital signal range after the A/D converter 110c. The leakage charge component $C_p*Vs$ of the servo signal is required to be cancelled in the form of a discrete time waveform after a change in waveform by the frequency characteristic of the analog filter 110b of the detection circuit 110 (by the filtering) followed by sampling by the A/D converter 110c. For this reason, in embodiment 1, the servo signal Vs output from the control circuit 112 is filtered by a digital or other filter, thus generating a discrete time waveform corresponding to the above discrete time waveform acquired by the A/D converter 110c. Further, the generated discrete time waveform is multiplied by an estimated leakage amount of the servo signal corresponding to the above capacitance value $C_p$, thus generating a cancellation signal. Finally, the subtractor 123 cancels the leakage charge component $C_p*Vs$ of the servo signal by subtracting the generated cancellation signal from the output of the A/D converter 110c.

A more specific description will be given next. The servo signal Vs output from the control circuit 112 is supplied to the up-sampler 118, and a digital output of the up-sampler 118 is supplied to the digital filter 119. A digital signal filtered by the digital filter 119 is supplied to the down-sampler 120. The digital output of the down-sampler 120 is supplied to the multiplier 121 and the search unit 122. The multiplier 121 multiplies the digital output from the down-sampler 120 and the digital output from the search unit 122 and supplies the digital signal acquired by the multiplication to the subtractor 123 as a cancellation signal. The digital signal output from the subtractor 123 is supplied to the search unit 122 and, as described above, to the demodulator 111.

To simulate the frequency characteristic of the analog filter 110b that operates on a continuous-time basis, the up-sampler 118, the digital filter 119, and the down-sampler 120 are used in combination. The servo signal Vs with the signal rate of fs is processed in this order. The operation rate of the one-bit converter 112b is fs as described earlier. Therefore, the signal rate of the servo signal Vs is also fs. The up-sampler 118 changes the signal rate of the supplied servo signal Vs from fs to M*fs, thus increasing the signal rate M-fold. In the case where the servo signal Vs is, for example, "1" during the period T, the up-sampler 118 multiplies the number of "1s" by M during the period T, thus increasing the signal rate of the servo signal Vs M-fold. This provides an operation close to the continuous time operation of the analog filter 110b. The digital filter 119 is operated at the rate of M*fs. The characteristic of the digital filter 119 is set on the basis of a transfer function of the analog filter 110b such that the digital filter characteristic matches the frequency characteristic of the analog filter 110b. The digital filter 119 configured as described above can be realized as an IIR filter on the basis of the transfer function of the analog filter 110b by using a known technique such as bilinear transform. The digital filter 119 may be realized as an FIR filter through approximate expansion.

The down-sampler 120 simulates the sampling operation of the A/D converter 110c. That is, the down-sampler 120 synchronizes the phase of the digital signal whose signal rate is M×fs output from the digital filter 119 with the sampling timing of the A/D converter 110c, reduces a sampling count to once in M times, and outputs the count. As a result, the output rate of the down-sampler 120 changes to fs.

The search unit 122 searches for and derives an estimated leakage amount (noise amount) of the servo signal Vs through adaptive control such as LMS algorithm on the basis of the output signals of the subtractor 123 and the down-sampler 120.

<Search Unit>

Figure 8:
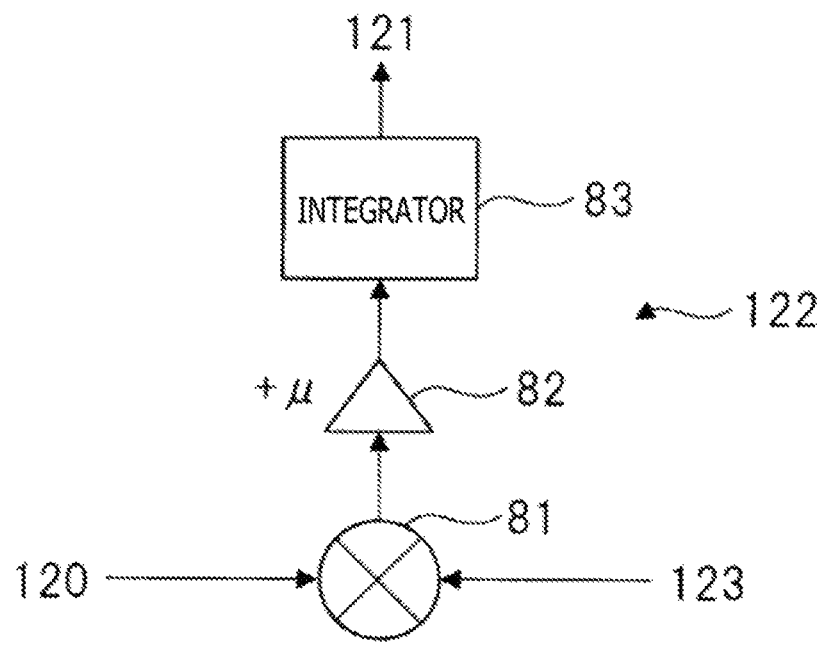
FIG. 8 is a block diagram illustrating a configuration of a search unit according to embodiment 1.

FIG. 8 is a block diagram illustrating a configuration of the search unit according to embodiment 1. The search unit 122 includes a multiplier 81, a gain multiplier 82, and an integrator 83. The multiplier 81 finds the product of the output signals of the subtractor 123 and the down-sampler 120. The output of the multiplier 81 is multiplied by a step size '+μ' for determining a gain of a negative feedback adaptive control loop that includes the multiplier 121, the subtractor 123, and the search unit 122 by the gain multiplier 82, after which the output signal of the gain multiplier 82 is integrated by the integrator 83 and then supplied to the multiplier 121.

Finding the product of the output signals of the subtractor 123 and the down-sampler 120 with the multiplier 81 allows the component based on the servo signal Vs to be squared and become constant. As a result, a component equivalent to the leakage amount of the servo signal Vs included in the output signal of the subtractor 123 is multiplied by the gain multiplier 82 and integrated by the integrator 83, thus generating an estimated leakage amount of the servo signal Vs. The multiplication of the discrete time waveform, the output signal of the down-sampler 120, by the estimated leakage amount of the servo signal Vs with the multiplier 121 generates a cancellation signal. That is, the estimated leakage amount is superimposed on the discrete time waveform from the down-sampler 120 that simulates the output signal waveform of the analog filter 110*b* output from the A/D converter 110*c*, thus generating a cancellation signal. The subtractor 123 subtracts the cancellation signal from the output signal from the A/D converter 110*c*. This means that the estimated leakage amount is subtracted from the output signal of the A/D converter 110*c*. The above negative feedback adaptive control functions in such a manner as to reduce the leakage amount included in the output signal from the A/D converter 110*c*.

To achieve a desired accuracy for cancelling the leakage amount, operation word lengths of the digital filter 119, the multiplier 121, the search unit 122, the subtractor 123, and so on are set equal to or larger than the operation word length of the A/D converter 110*c*.

Although an example of supplying the output signal of the down-sampler 120 to the multiplier 81 was depicted in FIG. 8, the present invention is not limited thereto. For example, as indicated by a long dashed double-short dashed line 126 in FIG. 1, the servo signal Vs may be supplied to the search unit 122 so that the servo signal Vs from the control circuit 112 in place of the output signal of the down-sampler 120 is directly supplied to the multiplier 81. Even this allows the multiplier 81 to render the component of the servo signal Vs constant.

In the sensor 1 according to embodiment 1, acceleration signal detection based on a sensor signal from the sensor element is performed during servo control over the sensor element by using the servo signal Vs. That is, servo control over the sensor element and acceleration signal detection are carried out simultaneously in parallel rather than in a time-shared manner. This eliminates the need to perform servo control and acceleration signal detection at high speed. Additionally, a high voltage is not required to generate a strong electrostatic force. This permits reduction in power consumption of the sensor 1. Noise based on the servo signal Vs is produced because servo control over the sensor element and acceleration signal detection are carried out simultaneously in parallel. However, the cancellation signal can cancel the leakage component of the servo signal with high accuracy, thus reducing noise and providing a highly accurate sensor.

Embodiment 2

Figure 2:
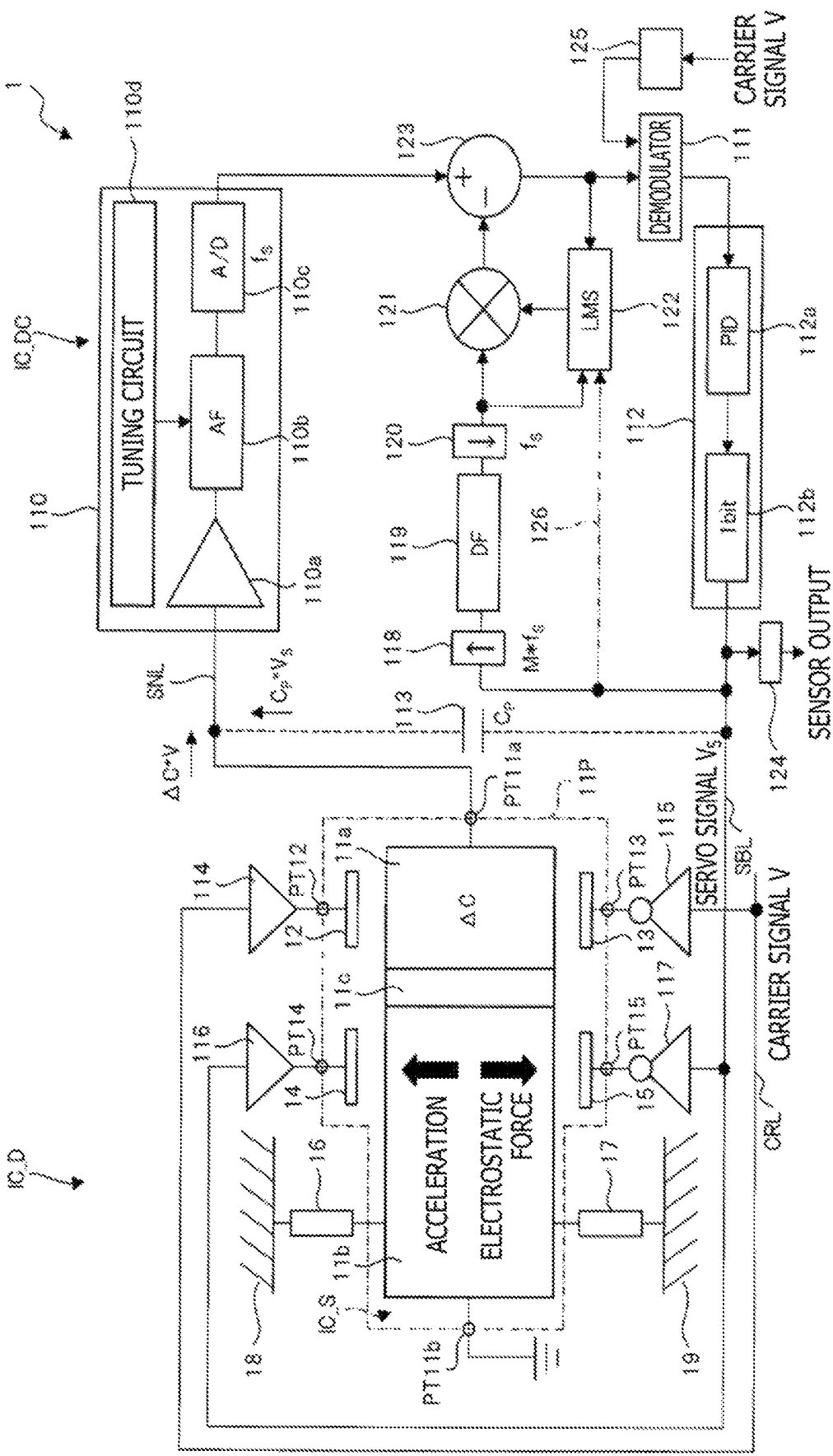
FIG. 2 is a block diagram illustrating a configuration of a sensor according to embodiment 2.

FIG. 2 is a block diagram illustrating a configuration of a sensor according to embodiment 2. FIG. 2 is similar to FIG. 1. Therefore, the difference between the two will be primarily described. The difference from FIG. 1 is that the detection circuit 110 has been changed. In FIG. 2, the detection circuit 110 further includes a tuning circuit 110*d*. The analog filter 110*b* is connected to the tuning circuit 110*d*. The analog filter 110*b* is set up by the tuning circuit 110*d* such that the analog filter 110*b* offers a desired frequency characteristic. The analog filter 110*b* and the tuning circuit 110*d* as described above can be realized, for example, by the technology described in non-patent document 2.

In embodiment 2, the analog filter 110*b* can be set up by the tuning circuit 110*d* such that the frequency characteristic of the analog filter 110*b* in the detection circuit 110 matches the frequency characteristic of the filter realized by the up-sampler 118, the digital filter 119, and the down-sampler 120. This allows for cancellation of the leakage amount of the servo signal described above with high accuracy.

Embodiment 3

Figure 3:
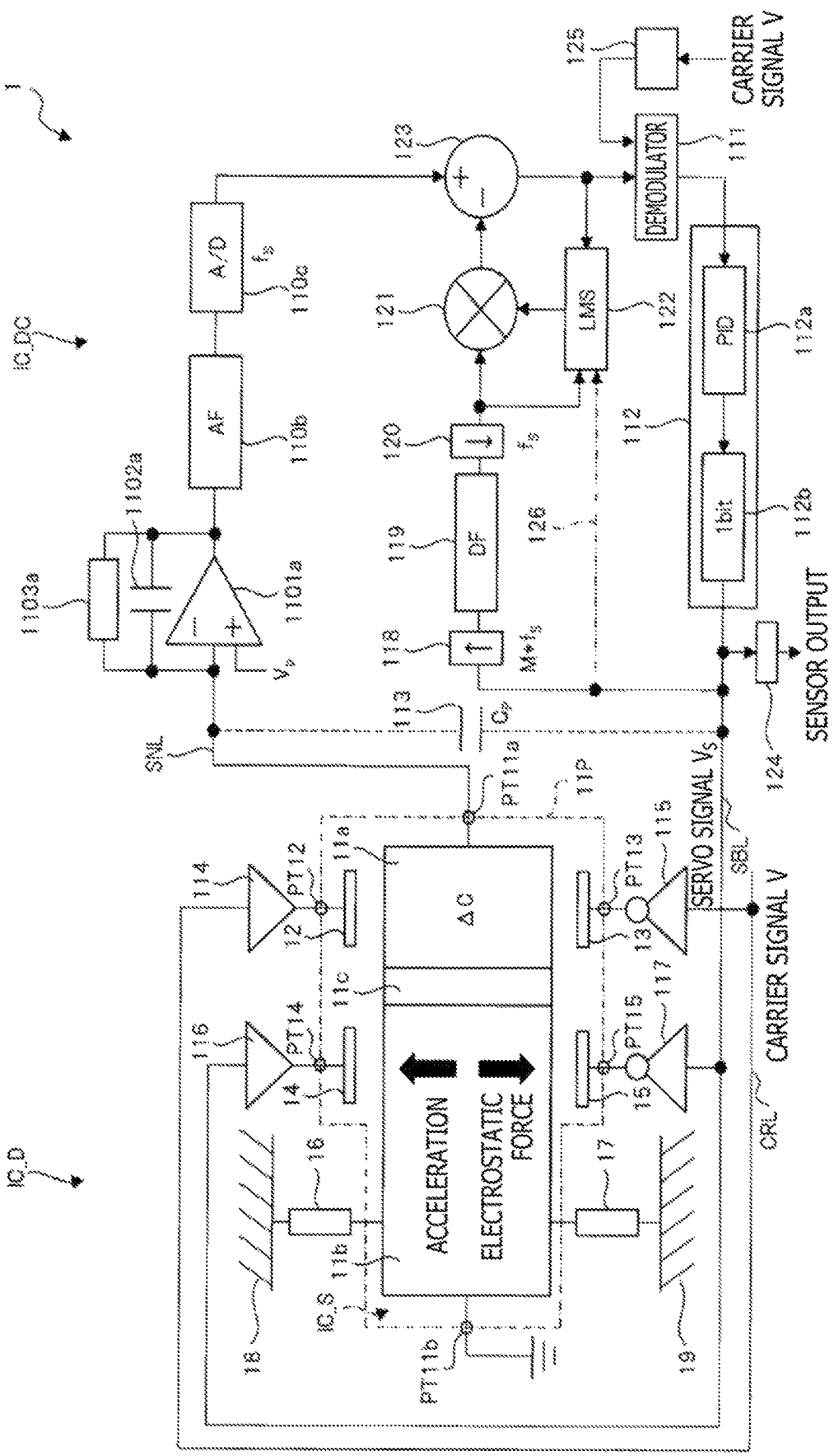
FIG. 3 is a block diagram illustrating a configuration of a sensor according to embodiment 3.

FIG. 3 is a block diagram illustrating a configuration of a sensor according to embodiment 3. FIG. 3 is similar to FIG. 1. Therefore, the difference between the two will be primarily described. FIG. 3 depicts, in detail, the configuration of the C/V conversion amplifier 110*a* illustrated in FIG. 1.

The C/V conversion amplifier 110*a* includes an amplifier 1101*a*, a capacitive element 1102*a*, and a resistive element 1103*a*. The amplifier 1101*a* includes a so-called op-amp. A given voltage Vb is supplied to a positive phase input node + of the amplifier 1101*a*, and an inverted input node (−) is connected to the wire SNL. An output node is connected to the input of the analog filter 110*b*. The capacitive element 1102*a* and the resistive element 1103*a* are connected in parallel between the inverted input node (−) and the output terminal of the amplifier 110*a*. As a result, a so-called negative feedback inversion amplifier is formed. In this configuration, the charge signal (ΔC*V) in the wire SNL is converted into a voltage signal by the capacitive element 1102*a* that functions as a feedback capacitance.

The resistive element 1103*a* includes a resistive element having a relatively high resistance. This resistive element 1103*a* forms a current feedback path for compensating for a leakage current on the inverted input node (−) of the amplifier 1101*a*, maintaining a DC potential of the output node of the amplifier 1101*a* at an optimal level.

A switch may be used in place of a resistive element having high resistance. In this case, however, sampling noise is generated as the switch is turned ON and OFF, resulting in larger noise than in the case where the resistive element 1103*a* is used. Thermal noise produced by the resistive element 1103*a* having high resistance is suppressed by the low-pass filter characteristic realized by the resistive element 1103*a* and the capacitive element 1102*a*. As a result, not only the components of the charge signal in the frequency range close to fs/2 but also noise of the sensor 1 remains unaffected.

Embodiment 4

Figure 4:
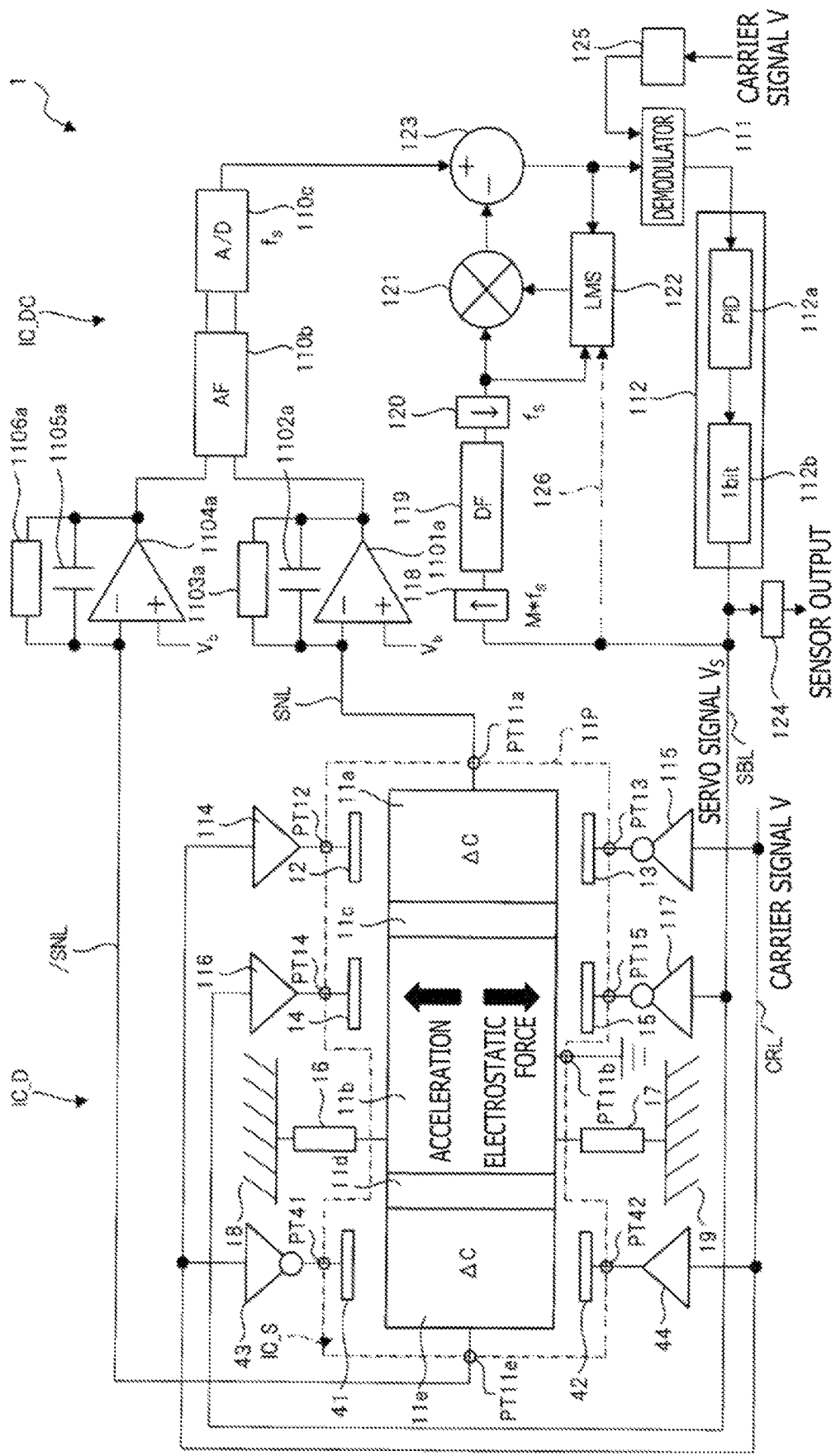
FIG. 4 is a block diagram illustrating a configuration of a sensor according to embodiment 4.

FIG. 4 is a block diagram illustrating a configuration of a sensor according to embodiment 4. In embodiment 4, the sensor signal output from the sensor element is changed to differential sensor signals, and the detection circuit also includes differential circuits. This can ensure higher resistance to in-phase noise, for example, in power and ground wires, thus contributing to reduced noise of the sensor.

FIG. 4 is very similar to FIG. 1. Therefore, the differences between the two will be primarily described.

<Sensor Semiconductor Device and Driving Semiconductor Device>

A second detection movable electrode 11*e*, an insulating portion 11*d*, second detection fixed electrodes 41 and 42, and terminals PT11*e*, TP41, and TP42 have been added to the sensor semiconductor device IC_S.

Although not particularly limited, the second detection movable electrode 11e is coupled, via the insulating portion 11d, to an edge portion side of the servo control movable electrode 11b to which the first detection movable electrode 11a is not coupled. The second detection movable electrode 11e is displaced in the same direction in coordination with the displacement of the servo control movable electrode 11b as is the first detection movable electrode 11a. This second detection movable electrode 11e is connected to the terminal PT11e of the package 11P. The second detection fixed electrode 41, arranged to be opposed to a portion (surface) of the second detection movable electrode 11e that is arranged to be opposed to the frame 18, is connected to the terminal PT41 of the package 11P. The second detection fixed electrode 42, arranged to be opposed to a portion of the second detection movable electrode 11e that is arranged to be opposed to the frame 19, is connected to the terminal PT42 of the package 11P. The second detection fixed electrodes 41 and 42 are fastened to the frames 18 and 19 of the sensor 1 as are the first detection fixed electrodes 12 and 13.

A detection buffer 44 and a detection inversion buffer 43 have been added to the driving semiconductor device IC_D. As illustrated in FIG. 4, a carrier signal whose phase has not been inverted is supplied, via the detection buffer 114, to the first detection fixed electrode 12 opposed to the portion of the first detection movable electrode 11a that is arranged in the direction where the first detection movable electrode 11a is opposed to the frame 18. In contrast, a carrier signal whose phase has been inverted by the detection inversion buffer 43 is supplied to the second detection fixed electrode 41 opposed to the portion of the second detection movable electrode 11e that is opposed to the same frame 18. Similarly, a carrier signal whose phase has been inverted by the detection inversion buffer 115 is supplied to the first detection fixed electrode 13 opposed to the portion of the first detection movable electrode 11a that is arranged in the direction where the first detection movable electrode 11a is opposed to the frame 19. In contrast, a carrier signal whose phase has not been inverted is supplied, via the detection buffer 44, to the second detection fixed electrode 42 opposed to the portion of the second detection movable electrode 11e that is opposed to the same frame 19.

This allows for use of a pair of sensor signals output from the first detection movable electrode 11a and the second detection movable electrode 11e as differential signals. That is, carrier signals of opposite phases are applied to two detection capacitance pairs, i.e., a first detection capacitance pair formed between the first detection fixed electrodes 12 and 13 and the first detection movable electrode 11a and a second detection capacitance pair formed between second detection fixed electrodes 41 and 42 and the second detection movable electrode 11e. As a result, a positive phase charge signal proportional to the charge signal ΔC*V is output to the wire SNL from the first detection movable electrode 11a as a positive phase sensor signal. In contrast, a reverse phase charge signal proportional to a charge signal −ΔC*V is output to a wire /SNL (second wire) from the second detection movable electrode 11e as a reverse phase sensor signal.

<Detection/Control Semiconductor Device>

In the detection/control semiconductor device IC_DC, the detection circuit 110 has been changed. That is, the detection circuit 110 includes a first C/V conversion amplifier, a second C/V conversion amplifier, the differential analog filter 110b, and the differential A/D converter 110c. The first C/V conversion amplifier converts a positive phase charge signal into a positive phase voltage signal. The second C/V conversion amplifier converts a reverse phase charge signal into a reverse phase voltage signal. The first C/V conversion amplifier is connected to the wire SNL and includes the amplifier 1101a, the capacitive element 1102a, and the resistive element 1103a. The second C/V conversion amplifier is connected to the wire /SNL and includes an amplifier 1104a, a capacitive element 1105a, and a resistive element 1106a. The first and second C/V conversion amplifiers are configured and operate in the same manner as the C/V conversion amplifier described in embodiment 3. Therefore, the description thereof will be omitted.

The differential analog filter 110b outputs differential signals by filtering differential voltages between the positive phase voltage signal from the first C/V conversion amplifier and the reverse phase voltage signal from the second C/V conversion amplifier. The differential signals are converted into a digital signal by the differential A/D converter 110c and supplied to the subtractor 123. It should be noted that although the equivalent parasitic capacitance illustrated in FIGS. 1 to 3 is omitted in FIG. 4, an equivalent parasitic capacitance is connected between the wires SBL and SNL and between the wires SBL and /SNL.

The sensor signals from the sensor element are differential sensor signals (positive and reverse phase sensor signals), and the detection circuit 110 also includes differential circuits, thus providing improved resistance to in-phase noise.

Embodiment 5

Figure 5:
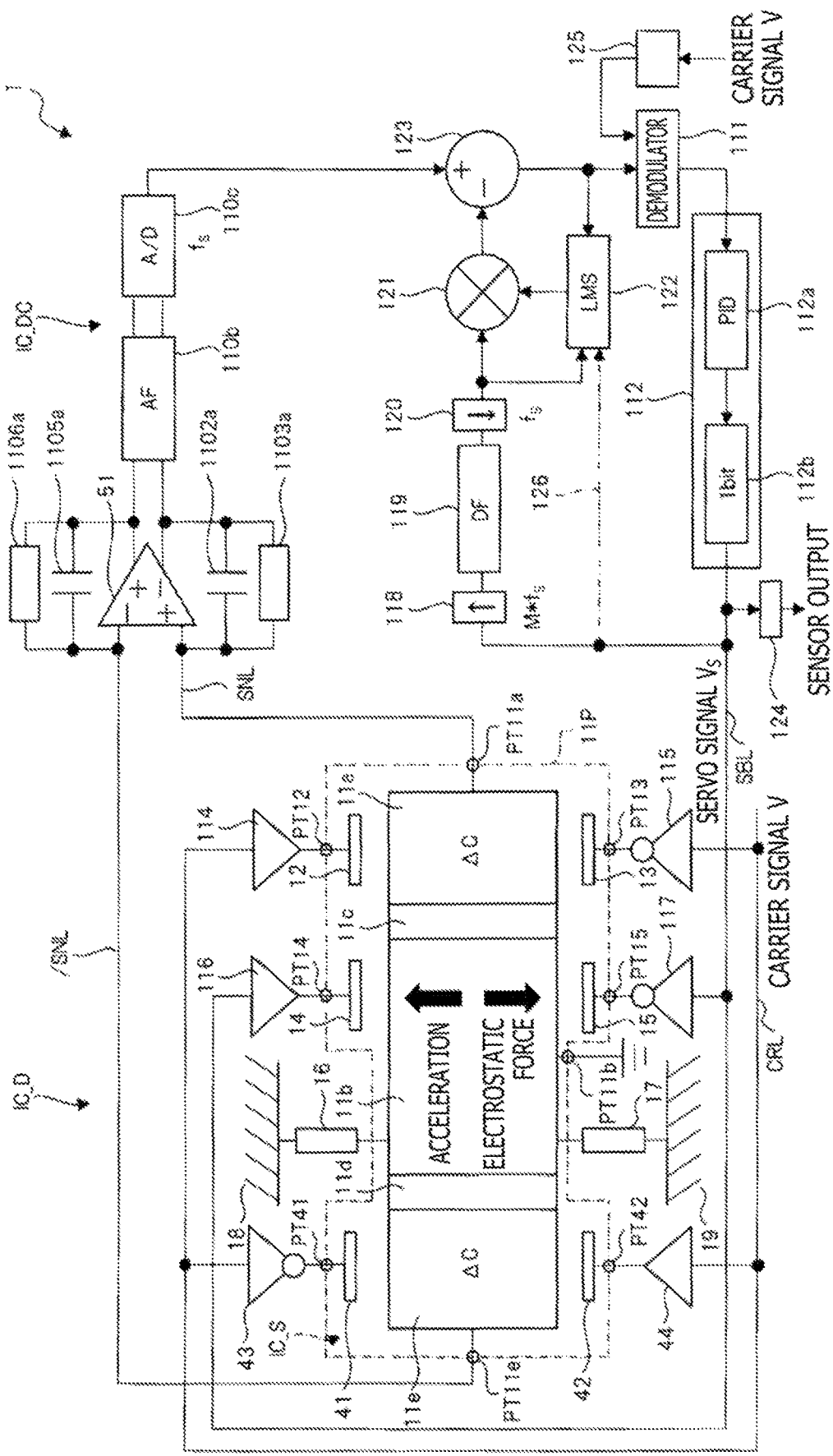
FIG. 5 is a block diagram illustrating a configuration of a sensor according to embodiment 5.

FIG. 5 is a block diagram illustrating a configuration of a sensor according to embodiment 5. FIG. 5 is similar to FIG. 4. Therefore, the difference between the two will be primarily described. In FIG. 4, the first and second C/V conversion amplifiers included pseudo-differential amplifiers that used two op-amps independently. In contrast, in embodiment 5, a fully differential op-amp 51 is used as an amplifier. That is, the fully differential op-amp 51 has its inverted input node (−) connected to the wire /SNL, and the capacitive element 1105a and the resistive element 1106a are connected in parallel between this inverted input node (−) and a positive phase output node (+). The fully differential op-amp 51 has its positive input node (+) connected to the wire SNL, and the capacitive element 1102a and the resistive element 1103a are connected in parallel between this positive phase input node (+) and an inverted output node (−). Differential signals of the positive phase output node (+) and the inverted output node (−) are supplied to the analog filter 110b at the next stage. Embodiment 5 provides reduced noise, power consumption, and circuit area. However, embodiment 4 is easier in terms of circuit design.

Embodiment 6

Figure 6:
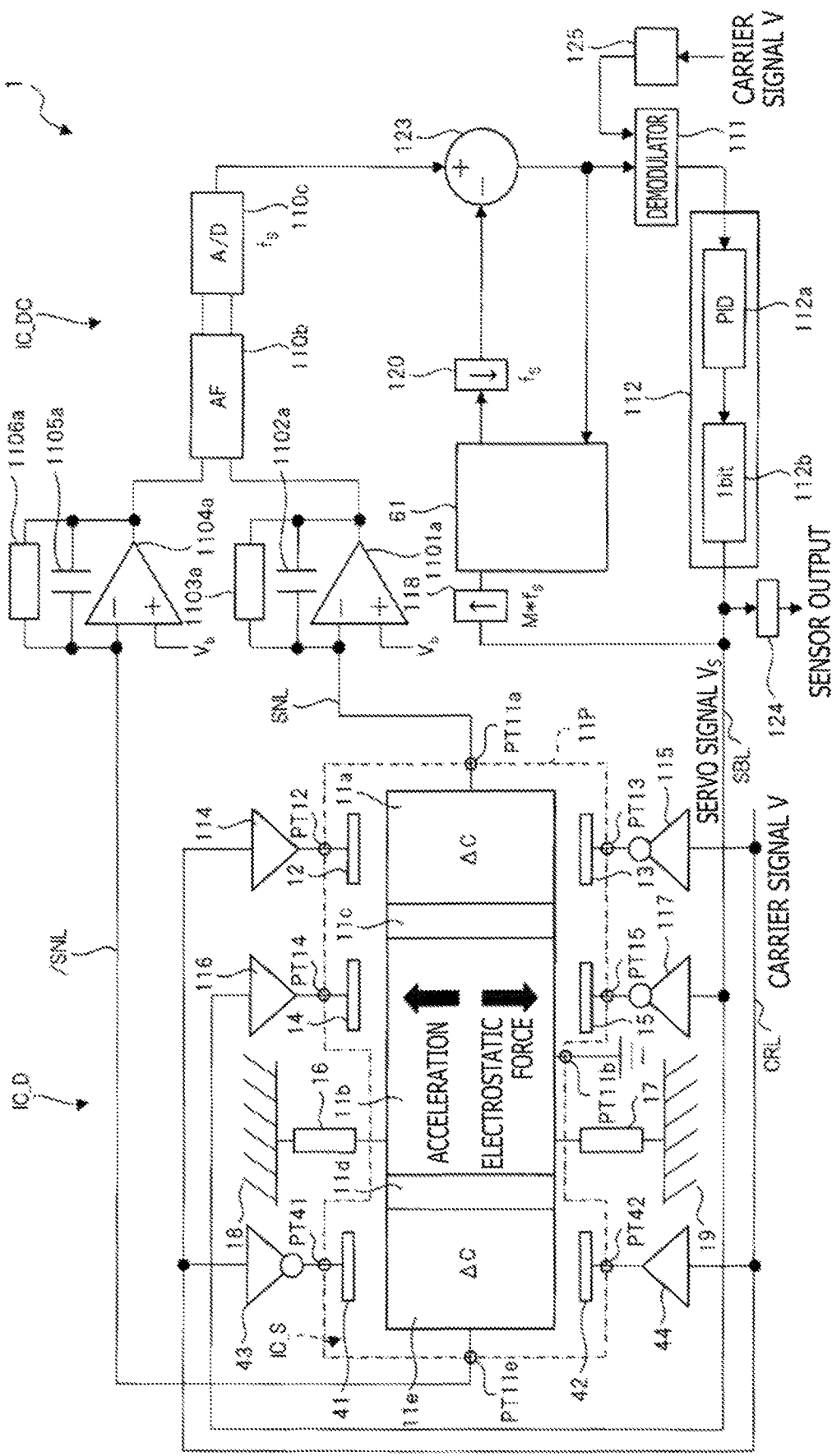
FIG. 6 is a block diagram illustrating a configuration of a sensor according to embodiment 6.

FIG. 6 is a block diagram illustrating a configuration of a sensor according to embodiment 6. FIG. 6 is similar to FIG. 4. Therefore, the difference between the two will be primarily described. In embodiment 6, the digital filter 119 depicted in FIG. 4 includes an FIR filter, and further, the multiplier 121 depicted in FIG. 4 has been incorporated into the FIR filter.

In general, an FIR filter computes a weighted sum of an input signal and signals acquired by sequentially delaying the input signal by a clock period and outputs the weighted sum. That is, the FIR filter computes a weighted sum of an input signal, a signal delayed by one clock period from the input signal, a signal delayed by two clock periods from the input signal, and so on up to a signal delayed by N clock periods from the input signal and outputs the weighted sum. A weight coefficient by which each signal is multiplied is referred to as a tap coefficient, and the frequency characteristic of the FIR filter is determined by a ratio thereof.

In embodiment 6, the estimated leakage amount of the servo signal Vs described above is multiplied by a weight coefficient, and a weight coefficient acquired by the multiplication is used as a tap coefficient of the FIR filter. This eliminates the need for the multiplier 121 depicted in FIG. 4, thus providing an FIR filter with no multiplier. In FIG. 6, reference numeral 61 denotes an FIR filter, and the FIR filter 61 includes an FIR filter and a tap coefficient search unit for searching for that tap coefficient.

Figure 7:
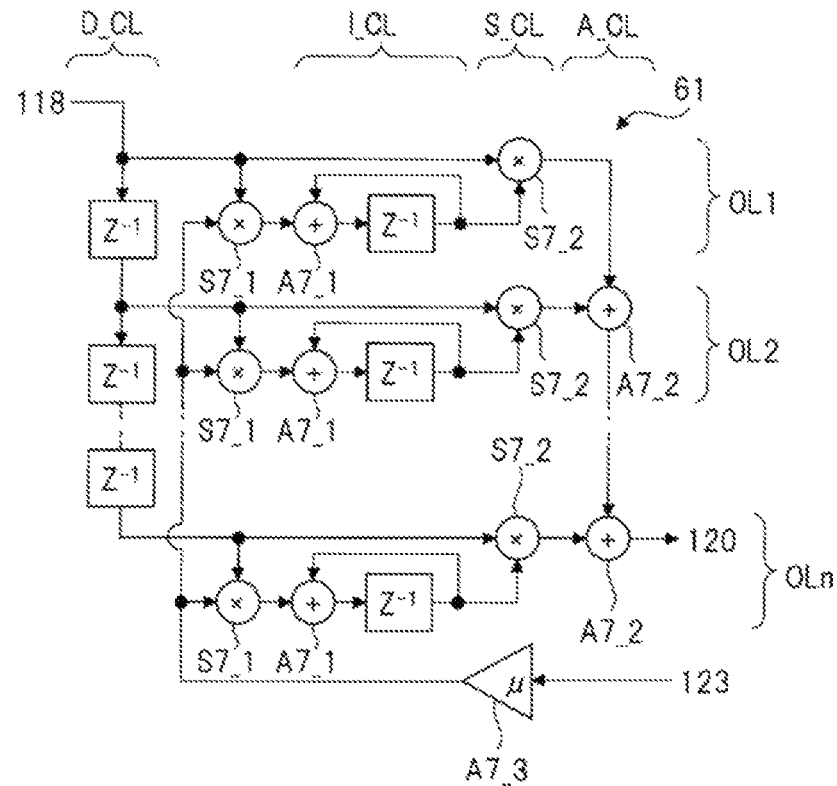
FIG. 7 is a diagram illustrating a configuration of an FIR filter according to embodiment 6.

FIG. 7 is a diagram illustrating a configuration of an FIR filter according to embodiment 6. In FIG. 7, reference numeral $Z^{-1}$ denotes a one-clock period delayer.

An input signal from the up-sampler 118 is sequentially delayed by a column of delayers D_CL arranged on the left in FIG. 7. The input signals from the column of delayers D_CL and the respective delayed signals are multiplied by corresponding tap coefficients by corresponding multipliers S7_2 in a column of multipliers S_CL depicted on the right in FIG. 7. The corresponding tap coefficients are generated by a column of integrators I_CL depicted near the center in FIG. 7. Each of the integrators in the column of integrators I_CL includes a loop of the delayer $Z^{-1}$ and an adder A7_1 depicted near the center in FIG. 7, and the output of integrator is supplied to the corresponding multiplier S7_2.

The output of the subtractor 123 is multiplied by a parameter μ by a multiplier A7_3, and the output of the multiplier A7_3 is multiplied by each of the delayed signals from the column of delayers D_CL, and the resultant signal is supplied to the corresponding integrator as input.

In FIG. 7, reference numerals OL1 to OLn denote calculation rows for performing calculation between the input signal or the delayed signal delayed by the delayer ($Z^{-1}$) and the output of the subtractor 123 from the multiplier A7_3. For example, the calculation row OL1 denotes a calculation row for performing calculation between the input signal and the output of the subtractor 123 from the multiplier A7_3, and the calculation row OL2 denotes a calculation row for performing calculation between the delayed signal from the delayer ($Z^{-1}$) at the first stage and the output of the subtractor 123 from the multiplier A7_3. Multipliers S7_1 and S7_2, an adder A7_1, and the delayer ($Z^{-1}$) provided in the calculation row OL1 handle the input signal from the column of delayers D_CL (signal from the up-sampler 118). The multipliers S7_1 and S7_2, the adder A7_1, and the delayer ($Z^{-1}$) provided in the calculation row OL2 handle the delayed signal from the delayer ($Z^{-1}$) at the first stage. From here onwards, each of the calculation rows up to the calculation row OLn similarly performs calculation between the delayed signal from the corresponding delayer ($Z^{-1}$) and the output of the subtractor 123 as in the calculation row OL2. The calculation results of the calculation rows OL1 to OLn are added together by adders A7_2 provided in a column of adders A_CL, thus generating an output to the down-sampler 120.

As a result, in the calculation rows OL1 to Oln, appropriate tap coefficients are searched for for the outputs of the respective integrators in the column of integrators I_CL. For example, in the case where the current tap coefficient is still not appropriate, that is, in the case where there is a mismatch between the analog filter 110b and the FIR filter 61, of the delayed signals generated by the column of delayers D_CL, a delay signal component corresponding to the mismatch remains in the output of the subtractor 123.

For example, in the case where a delayed signal component of the delayer ($Z^{-1}$) at the first stage remains in the output of the subtractor 123 due to a mismatch, the remaining delayed signal component is integrated by the integrator provided in the calculation row OL2 corresponding to the delayed signal of the delayer ($Z^{-1}$) at the first stage, thus generating a DC component. This DC component is output from the integrator to the corresponding multiplier S7_2 as a tap coefficient. This allows the tap coefficient to be updated in a more appropriate manner.

Owing to negative feedback control using the output of the subtractor 123, each tap coefficient generated as an output of each integrator automatically converges at a ratio that provides a frequency characteristic approximate to the frequency characteristic of the analog filter 110b and to a value that has been multiplied by the estimated leakage amount of the servo signal Vs. For this reason, in embodiment 6, even if the frequency characteristic of the analog filter 110b changes, for example, due to manufacturing variation or temperature fluctuation, the tap coefficients are automatically adjusted to values appropriate to such a change, thus making it possible to maintain highly accurate cancellation. That is, in embodiment 6, the characteristic of the digital FIR filter 61 is automatically adjusted to match the characteristic of the analog filter 110b.

It should be noted that, in FIG. 7, the column of adders A_CL depicted on the right indicates the column of adders A7_2 for adding the respective delayed signals that have been multiplied by tap coefficients. That is, the column of adders A_CL depicts an adder unit of the FIR filter 61 having a weighted summation function. Because the multiplier 121 has been incorporated into the FIR filter 61, the output of this FIR filter 61 is supplied to the down-sampler 120, and the output of the down-sampler 120 is supplied to the subtractor 123 as a cancellation signal.

The A/D converter 110c described in embodiments 1 to 6 can be considered to convert the waveform generated by the filtering using the analog filter 110b into a first digital signal.

The up-sampler 118, the digital filter 119, the down-sampler 120, the search unit 122, and the multiplier 121 described in embodiments 1 to 5 can be considered as a first electronic circuit that includes the digital filter 119, performs signal processing including the filtering process, and outputs a second digital signal, the cancellation signal, to the subtractor 123 from the multiplier 121. In embodiment 6, the up-sampler 118, the FIR filter 61, and the down-sampler 120 correspond to the first electronic circuit including a digital filter, and the cancellation signal supplied from the down-sampler 120 to the subtractor 123 corresponds to the second digital signal.

In embodiments 1 to 6, the subtractor 123 can be considered as a second electronic circuit that subtracts the second digital signal from the first digital signal and outputs the subtraction result as a third digital signal.

In embodiments 1 to 5, the multiplier 121 changes the waveform acquired by the filtering using the digital filter 119 in accordance with the output of the search unit 122 based on the third digital signal. In embodiment 6, on the other hand, the tap coefficient of the FIR filter 61 is changed on the basis of the third digital signal. That is, in any of embodiments 1 to 6, the setting for signal processing for acquiring the second digital signal is changed on the basis of the third digital signal.

The control circuit 112 depicted in embodiments 1 to 6 can be considered to generate a fourth digital signal, the servo signal Vs, on the basis of the third digital signal.

It should be noted that although, in embodiments 1 to 6, the up-sampler 118 is used as a way of simulating the frequency characteristic of the analog filter 110b that operates on a continuous-time basis, and the digital filter 119 is operated at a high operation rate in keeping with the continuous-time operation of the analog filter 110b. Alternatively, however, the digital filter 119 may be operated at the operation rate of fs equal to the output rate of the servo signal Vs after removing the up-sampler 118 and the down-sampler 120. In that case, in embodiments 1 to 6, it is only necessary to derive each of the tap coefficients of the digital filter 119 by performing a given calculation equivalent to discrete time/continuous time conversion on an impulse response of the analog filter 110b and apply the tap coefficients. In the case of embodiment 6, the respective tap coefficients subjected to the given calculation are automatically searched for by the configuration.

Specific descriptions have been given above of the invention achieved by the present inventor. However, the present invention is not limited to the embodiments described above and may be modified in various ways without departing from the gist of the invention. For example, although an example was described in which the sensor 1 included three semiconductor devices, the present invention is not limited to this number. For example, the driving semiconductor device and the detection/control semiconductor device may be made up of a single semiconductor device so that the sensor 1 includes two semiconductor devices.

What is claimed is:

1. A sensor comprising:
a sensor element;
an analog filter adapted to filter a waveform including a sensor signal from the sensor element and a noise based on a servo signal for controlling the sensor element;
an A/D convertor adapted to convert a waveform filtered by the analog filter into a first digital signal;
a first electronic circuit including a digital filter and adapted to acquire a second digital signal by performing a signal processing including at least a filtering process using the digital filter on the servo signal; and
a second electronic circuit adapted to acquire a third digital signal by subtracting the second digital signal from the first digital signal, wherein
the first electronic circuit changes a setting for the signal processing for acquiring the second digital signal at least on the basis of the third digital signal to change the second digital signal.

2. The sensor of claim 1 further comprising:
a control circuit adapted to control the sensor element by using the servo signal;
a first wire adapted to connect the control circuit and the sensor element; and
a second wire adapted to connect the sensor element and the analog filter, wherein
the noise based on the servo signal includes at least noise associated with the servo signal transferred by a parasitic capacitance between the first and second wires.

3. The sensor of claim 1, wherein
the noise based on the servo signal changes in response to a change in the servo signal.

4. The sensor of claim 1, wherein
the sensor element is an acceleration sensor element that converts an acceleration change into a capacitance change and generates the sensor signal on the basis of a carrier signal that supplies a voltage to said sensor element which varies with said capacitance change and that is a signal different from the servo signal, and of the capacitance change.

5. The sensor of claim 1, wherein
the second digital signal is a signal that simulates the waveform acquired by filtering the noise based on the servo signal with the analog filter.

6. The sensor of claim 2, wherein
the servo signal is a digital signal based on the third digital signal, and
the servo signal is output via a low-pass filter as a sensor output.

7. The sensor of claim 4, wherein
the carrier signal is a signal at a given frequency and generated as the sensor signal by superimposing the capacitance change on the carrier signal.

8. The sensor of claim 7, wherein
the sensor element includes:
a first detection movable electrode whose position changes with change in acceleration; and
first detection fixed electrodes opposed to the first detection movable electrode and to which a signal based on the carrier signal is supplied, and wherein
a change of distances between the first detection movable electrode and the first detection fixed electrodes turns into the capacitance change.

9. The sensor of claim 8, wherein
the sensor element further includes:
a servo control movable electrode coupled to the first detection movable electrode;
springs coupled to the servo control movable electrode; and
servo control fixed electrodes to which a signal based on the servo signal is supplied, and
elastic forces of the springs and an electrostatic force that occurs between the servo control fixed electrodes and the servo control movable electrode are exerted on the servo control movable electrodes.

10. The sensor of claim 1, wherein
the first electronic circuit further includes:
an up-sampler;
a down-sampler;
an operator; and
a search unit adapted to search for a noise amount on the basis of the third digital signal and a digital signal based on the servo signal,
the servo signal is up-sampled by the up-sampler, and the digital signal up-sampled by the up-sampler is supplied to the digital filter, and an output of the digital filter is down-sampled by the down-sampler, and
the operator generates the second digital signal on the basis of the digital signal down-sampled by the down-sampler and an output of the search unit.

11. The sensor of claim 10, wherein
the search unit searches for the noise amount on the basis of the digital signal acquired by the down-sampler and the third digital signal.

12. The sensor of claim 9, wherein
the sensor element includes:
a second detection movable electrode coupled to the servo control movable electrode; and
second detection fixed electrodes opposed to the second detection movable electrode and to which a second carrier signal inverted in phase from the carrier signal is supplied, and a sensor signal from the first detection movable electrode and a sensor signal from the second detection movable electrode are supplied to the analog filter.

13. The sensor of claim 1, wherein a characteristic of the digital filter is set by a tap coefficient, and the tap coefficient is changed on the basis of the third digital signal.

14. The sensor of claim 13, wherein the digital filter is an FIR filter.

* * * * *